G. E. REHBERGER.
SOIL PULVERIZER.
APPLICATION FILED JUNE 14, 1918.

1,287,749.

Patented Dec. 17, 1918.

Witnesses.
Porter H. Flautt,
Emma Wehmeyer

Inventor
George E. Rehberger.
By Edwin P. Samuels
Attorney

UNITED STATES PATENT OFFICE.

GEORGE E. REHBERGER, OF PHOENIX, MARYLAND.

SOIL-PULVERIZER.

1,287,749.　　　　　Specification of Letters Patent.　　Patented Dec. 17, 1918.

Application filed June 14, 1918.  Serial No. 240,025.

*To all whom it may concern:*

Be it known that I, GEORGE E. REHBERGER, a citizen of the United States of America, residing at Phoenix, county of Baltimore, State of Maryland, have invented certain new and useful Improvements in Soil-Pulverizers, of which the following is a specification.

The preparation of soil for planting, under present conditions, requires several operations. The mimimum treatment which will suffice consists in first plowing to turn the soil and then harrowing to pulverize it. When so treated, it is only the soil which is left on the surface after the turning operation which is really pulverized. This is more than ever true where the soil is a bit moist or held together by vegetation. The double treatment by plowing and harrowing is also expensive in that it requires the repeated traversing of the land by tractor or draft animals both for the plow and the harrowing operations.

The object of the invention is to increase the thoroughness of the treatment of the soil and at the same time reduce the cost of preparing it.

The apparatus embodying the invention consists of a rotary screw, pulverizer blade and a casing containing the blade, the forward end of the casing being in the form of a scoop which is open at the top to receive the clods of earth from the plow and into which scoop the pulverizer blade projects, so that it engages the clods of earth as they are received and feeds them backward to be broken by the screw coöperating with a suitable inclosing means and ejected in fined or pulverized condition. The pulverizer also includes suitable means for releasing stones and roots to avoid breakage.

To provide for the feeding of clods of earth to the pulverizer scoop and to simplify the operation of treating the earth in preparation for planting, I combine the pulverizer with a plow, the latter being preferably set to one side, *i. e.*, in the cutting direction from the pulverizer and a little ahead of it, so that the clods of earth as they are turned up by the plow drop into the scoop for treatment by the pulverizer. The two implements as thus combined are preferably mounted on a suitably wheeled frame, the rotary screw being driven from one of the wheels.

In the accompanying drawing I have illustrated a combined plow and soil pulverizing machine embodying the features of my invention.

In this illustration Figure 1 is a plan.

Figure 1:
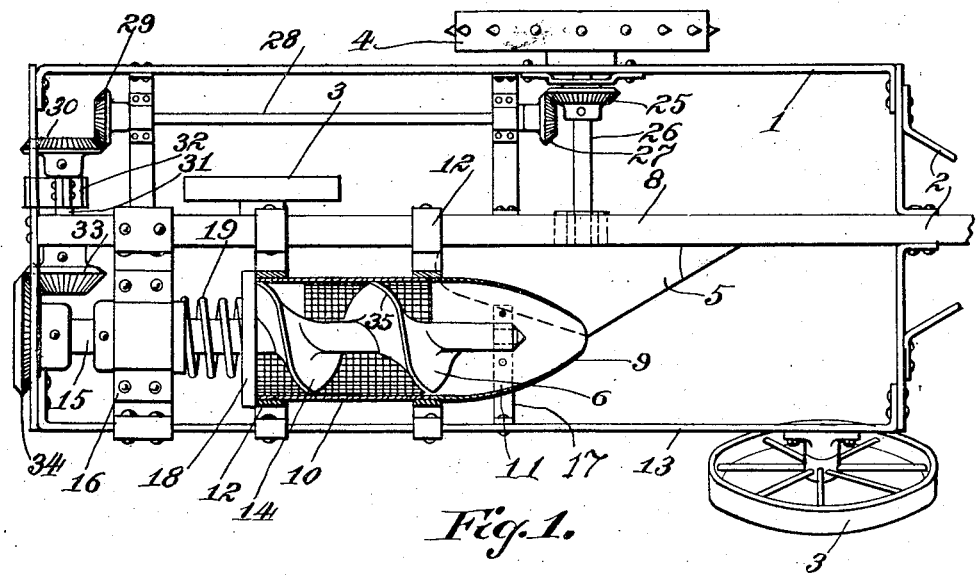
Figure 2:
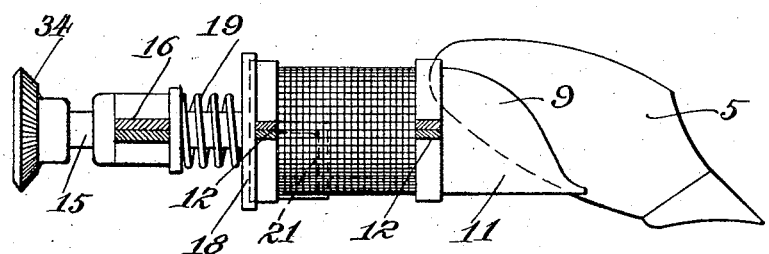
Fig. 2 is an elevation of the plow and pulverizer.
Figure 3:
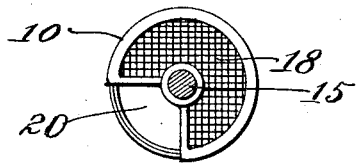
Fig. 3 is a rear view of the pulverizer.
Figure 4:
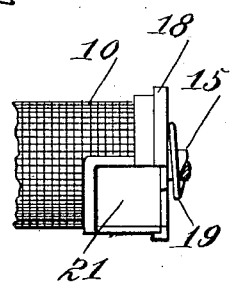
Fig. 4 is a fragmentary elevation of the pulverizer cylinder as seen from the side which is remote in Fig. 2.

Referring to the drawings by numerals, the machine, as illustrated, consists of a frame 1, a means 2 for attachment of a draft animal or tractor, supporting wheel 3 and a drive-wheel 4 for engagement with the ground to drive the breaking machinery as hereinafter described. The machine also includes a plow 5 and soil breaker 6, with the driving connections for the latter. The plow proper 5, which is of the usual type, is secured to the central longitudinal member 8 of the frame, normally, that is, during the operation of the machine in plowing and breaking the soil, extending downward from 6 to 12 inches beneath the tread of the wheels.

Positioned slightly to the rear of the plow and in the direction of the discharge, which in the usual right-hand plow illustrated is to the right, is a casing 9, the rear portion 10 of which is cylindrical, the front portion 11 being in the form of a scoop open at the top to receive the soil as turned over and deflected from the plow. This casing is supported on transverse struts 12 secured at their ends to the longitudinal frame members 8 and 13. Mounted in the casing with its axis preferably coincident with the cylindrical portion 10, is a screw pulverizer or agitator blade 14. This blade is mounted on a suitable shaft 15 having bearings in the transverse strut 16 and bracket 17. The cylinder is normally closed at the rear by a sliding disk 18 mounted on the shaft 15 and controlled as to its position by a spiral spring 19 encircling the shaft and bearing against the strut 16. This disk 18 is perforated to provide for the escape of the soil and has an opening 20 for the discharge of stones, sod, etc. The cylinder 10 is likewise perforated, at least as to its lower section, for the discharge of the pulverized soil, and has an opening 21 near the rear and in the lower quarter for the same purpose as opening 20.

The screw blade is driven by means of a bevel 25 on the shaft 26 of the wheel 4 which meshes with a bevel 27 on a longitudinal shaft 28 at the rear end of which is a second bevel 29 meshing with a bevel gear 30 on the transverse shaft 31 suitably supported on the frame by bearings 32. This shaft 31 carries at its opposite extremity a bevel gear 33 meshing with a bevel gear 34 on the shaft 15 of the pulverizer. The gear ratio may, of course, be varied to correspond to the consistency of the soil, depth of the cut and the traction power available.

The operation will be easily understood. As has been pointed out, the scoop member 11 of the pulverizer casing is directly in the path of the clods of earth deflected from the plow, so that they are received in the scoop as thrown off from the plow. The helical blade 35 of the pulverizer screw 14 projects into the scoop and takes up the earth as fast as it is received, forcing it backward through the cylindrical casing and breaking it completely as it goes, forcing the broken earth through the perforations in the casing and in the rear disk 18. Stones or other hard materials which cannot be handled by the pulverizer beyond a certain size will, of course, be excluded by the failure of the screw to engage them. The stones which are in the pulverizer but are too large to pass through the perforations will be passed through the openings 20, 21. The sod, roots, etc., when they accumulate in sufficient quantity will force the disk 18 to its seat with the results that such materials are periodically discharged without damage to the apparatus, and the earth is refined to the greatest possible extent.

The applicant is aware that attempts have been made to construct soil breakers by providing a plow or similar member with a helical breaker blade, but such attempts have failed because the blade, as provided, interferes with the free action of the plow; and other soil breakers arranged to catch the earth from the plow consist of meshing radial teeth mounted to pass in close relation so that any hard materials thrown up by the plow which are of too great size to pass between the teeth would inevitably check the operation of the machine, or failing this, break it.

I claim—

1. In a machine for breaking and pulverizing soil, a rotary screw blade, means for driving the same, a perforated casing or screen inclosing the blade and having a rear wall mounted to move rearwardly, a spring tending to hold the rear wall in its forward position, and a casing having an opening in the side wall near the rear.

2. In a machine for breaking and pulverizing soil, a rotary screw blade, means for driving the same, a perforated casing or screen inclosing the blade and having a rear wall mounted to move in the direction of the axis of the screw, a spring tending to hold the rear wall in its forward position, the rear wall having an opening for the discharge of unbreakable material.

3. A machine for breaking and pulverizing soil, consisting of a rotary screw-blade, means for driving the same, a casing inclosing the blade and having a rear wall mounted to move rearwardly, a spring tending to hold it in its forward position, and an open scoop in front of the casing.

Signed by me at Baltimore, Maryland, this 12 day of June, 1918.

GEORGE E. REHBERGER.

Witnesses:
ZELLA KUHN,
EMMA WEHMEYER.